Sept. 7, 1937.                H. B. COSLER                2,092,273
                         DECORATED FOOD PRODUCT
                        Original Filed Aug. 28, 1933
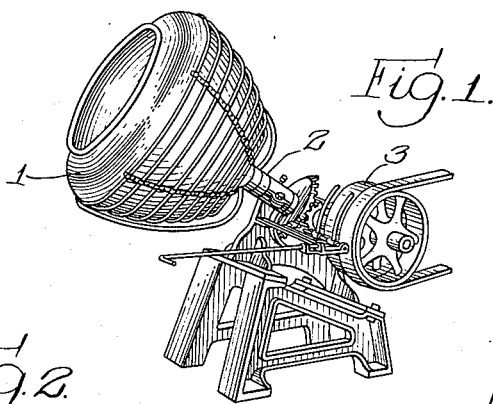
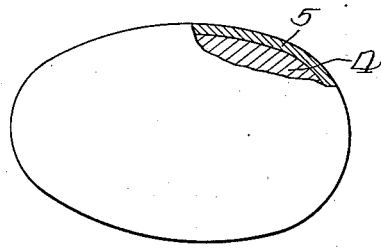
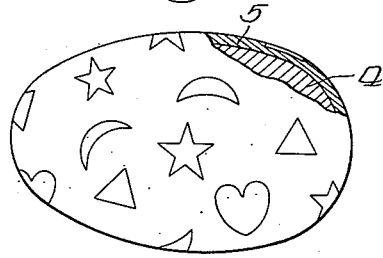
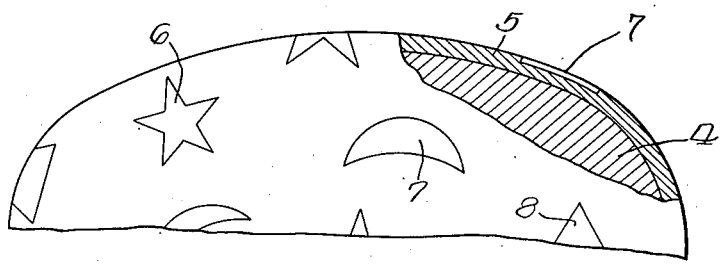
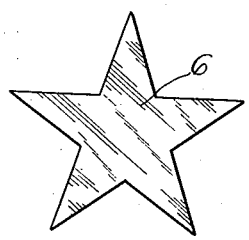
Inventor:-
Horace B. Cosler.
By: Wilson, Dowell, McCanna & Foley
                                Attys Patented Sept. 7, 1937

2,092,273

UNITED STATES PATENT OFFICE 2,092,273

DECORATED FOOD PRODUCT

Horace B. Cosler, Evanston, Ill., assignor to National Candy Company, Inc., St. Louis, Mo., a corporation of New Jersey Original application August 28, 1933, Serial No. 687,164. Divided and this application April 16, 1936, Serial No. 74,776

2 Claims. (Cl. 99—138)

This invention pertains to decorated candies and other articles of food.

The decoration of candies, cookies and other articles of food is one of the old and widely practiced arts and involves the use of many different materials for decorative purposes, but prior to my invention no one has used for decorative purposes thin edible sheet material cut or otherwise fashioned into decorative devices. This material has various advantages and its use brings to the art of candy and food decorating many new, useful and interesting possibilities.

For example, where the sheet material employed in practicing this invention is thin edible sheet gelatin, it can be cut readily by means of dies into a multitude of shapes, some of which are shown in the accompanying drawing. Many others will immediately suggest themselves to those skilled in the art. Furthermore, this material or other sheet material suitable for this purpose can be procured in various colors, whereby combinations of colors and shapes may be employed in infinite varieties to produce new and artistic effects in food decorating.

Another advantage arising from the use of this material and in connection with its application to articles of food is that it lends itself both to manual and machine decorating processes.

Another advantage possessed by this material for decorative purposes is that when the thin decorated devices are applied flatly to the articles of food they do not readily become detached, as is true of other decorations, such as granular sugar, pellet-like candy materials, chopped nut meats, shredded cocoanut, and other bulky substances. Hence, in the subsequent handling and packing of articles of food decorated in accordance with this invention, less care is required and the finished product delivered to the customer has not been deprived of any part of its decoration.

Various other advantages of the invention will be mentioned hereinafter or will become apparent from a perusal of this specification in which, for illustrative purposes, the mode of practicing the invention is described in the matter of decorating candy eggs known as "Easter eggs" with decorative devices formed of edible thin sheet material.

In the drawing forming a part of this specification:

Fig. 1 is a perspective of a "pan" employed in connection with this invention;

Fig. 2 is a side elevation with a part in section of a candy egg undecorated but ready for the decoration;

Fig. 3 is a side elevation partly in section showing a candy egg immediately after the decorated pieces have been applied;

Fig. 4 is a partial elevation and partial section, enlarged, of a candy egg showing the decoration applied;

Fig. 5 is a plan view of one of the decorative pieces; and

Fig. 6 is an end view of the same piece.

For applying the thin sheet decorative devices to candies of the variety made in "pans", use is made of the well known rotatable "pan" shown in Fig. 1. The pan made products, as is well known, are provided with a rather firm center and then are built up by application of coating material, such as sugar or other granular material, while tumbling in the pan. For example, candy eggs and candy hearts and other shapes are built in this manner. In practice, a quantity of syrup may be splashed over the tumbling articles and then sugar or other powdery material sprinkled over them, and as the tumbling continues, the sugar is caused to adhere to the centers with the aid of the syrupy material present. Also for some types of candies, liquid chocolate or other liquid material which will harden at atmospheric temperatures, or slightly below, is sprayed onto the candy centers to continue the coating process and sometimes to produce the final coating. In most instances, just prior to the finishing of the candies they will have a sticky coating and on this coating the thin decorative devices, for example of the character shown in the drawing, may then be lightly sprinkled upon the tumbling candies. It is found that these devices will become quite generally and uniformly distributed throughout the entire mass of candies and will become flatly rolled upon the surfaces of the candies by the interaction of the tumbling candies.

The drawing may be referred to for a better understanding of the above described procedure. The pan 1, secured to a shaft 2, driven by any suitable driving apparatus 3, will be recognized as the old and well known pan used in the candy industry. Before the beginning of the pan work, a center 4 is provided, for example, as by molding, and made of whatever material is customary for the particular type of candy being made. The coating which is built up in the pan is represented by the layer 5, while the various thin sheet-like decorative devices applied to the candies in the pan are represented by the devices 6, 7 and 8.

The material at present preferred is edible thin gelatin sheets colored with various edible coloring material, such as vegetable dyes or certified food colors. The particular designs employed are readily stamped out of the sheets by means of dies. Of course, other methods of producing the desired shapes may be employed, including manual cutting or stamping.

In place of gelatin sheets, thin sheets of colored or uncolored dough may be used, as well as other appropriate edible thin sheet material. Preferably the material employed will be as thin as ordinary writing paper, as pieces of such thinness can easily be made to adhere flatly to candies or other articles of food and will not readily be dislodged therefrom during the ordinary handling of the finished decorated product.

After the thin decorative devices have been applied, other coating material may be applied over them if desired. In the case of pan products, a finishing coating of sugar syrup may be employed or one may use a finishing coat of wax, to give the ultimate product a smooth and glossy appearance.

This invention, however, is not confined to pan made goods and the use of pans for applying these decorative articles. They may be sprinkled upon candies, cookies or other articles of food having at the time a sticky surface and may be caused to adhere flatly thereto merely by the force of gravity, by rollers or the application of air blasts or other methods suitable for effecting flat adherence of these thin devices.

Edible sheet gelatin is particularly adaptable to use in this invention as it is easily digested, need not necessarily alter the flavor which the article of food would have in its absence, while the material itself is flexible and not so brittle as to be subject to much, if any, breakage when being applied, or subsequently. Furthermore, this sheet material can be fashioned to depict not only such subject matter as is shown in the drawing, but also heads of animals or entire silhouettes of animals, which will constitute a class of decoration particularly interesting to children. Sheet dough, of course, may be used with considerable success in place of the edible thin sheet gelatin, and other materials may be utilized if desired.

Furthermore, the sheet materials specifically named, such as sheet dough and sheet gelatin may be made in colors and will retain their color without danger of the color running and producing blurred designs upon the articles of food.

Whether or not these thin sheet decorative devices are applied manually, semi-automatically or entirely automatically, they possess great superiority in the finished product over other decorative materials that have been known and utilized in the food decorating art. In my Patent No. 2,062,867, issued December 1, 1936, of which this application is a division, I have claimed methods of decorating candies and other food products wherein thin sheet-like decorative devices are utilized in the methods. This application, however, is concerned with the product rather than the process.

It should be appreciated that in view of the many modifications of this invention which its nature suggests, its scope is not confined to what is specifically described and illustrated herein, but is to be determined rather by the claims which follow.

Having shown and described my invention, I claim:

1. As a new article of manufacture, a candy having a plurality of outer layers of hardened liquid coating of which the outermost is transparent and a thin edible decorative device of limited area and having a definite outline lying flatly on the candy positioned between the outermost and the next subjacent layer and consisting of paper thin flexible sheet gelatin of different color than the adjacent layers and itself having a hard smooth surface.

2. As a new article of manufacture, a candy having a plurality of outer layers of hardened liquid coating of which the outermost is transparent and a plurality of separate thin edible decorative devices consisting of paper thin flexible sheet gelatin of different color than the adjacent layers and having a hard smooth surface, said devices being positioned between the outermost and the next subjacent layer and lying flatly on the candy.

HORACE B. COSLER.